United States Patent [19]

Hashimoto

[11] Patent Number: 4,850,005
[45] Date of Patent: Jul. 18, 1989

[54] TELEPHONE ANSWERING DEVICE WITH ARTIFICIAL INTELLIGENCE

[75] Inventor: Kazuo Hashimoto, Tokyo, Japan

[73] Assignee: Hashimoto Corporation, Tokyo, Japan

[21] Appl. No.: 82,335

[22] Filed: Aug. 6, 1987

[51] Int. Cl.⁴ .................... H04M 1/64; H04M 1/66
[52] U.S. Cl. ........................................ 379/51; 379/80; 379/88; 379/199
[58] Field of Search .................. 379/80, 88, 89, 67, 379/45, 51, 199

[56] References Cited

U.S. PATENT DOCUMENTS 4,488,005 12/1984 Frantz ............................... 379/88
4,653,097 3/1987 Watanabe et al. ................. 381/42

FOREIGN PATENT DOCUMENTS

| 0041060 | 3/1982 | Japan | 379/80 |
| 0138134 | 8/1983 | Japan | 379/58 |
| 0181767 | 10/1984 | Japan | 381/42 |
| 0235566 | 11/1985 | Japan | 381/42 |
| 0238148 | 10/1986 | Japan | 379/199 |
| 0238149 | 10/1986 | Japan | 379/199 |

Primary Examiner—Thomas W. Brown
Attorney, Agent, or Firm—Lowe, Price, LeBlanc, Becker & Shur

[57] ABSTRACT

In a telephone answering device, artificial intelligence sends an outgoing message to the caller upon receipt of an incoming call. When the caller responds, the artificial intelligence determines whether the caller's voice is registered with the device, and if so, particular messages are played to the caller. If the caller's voice is not registered, the caller is notified by the device, and he may receive his specific message by sending a touch tone code (e.g., telephone number) from his telephone.

6 Claims, 12 Drawing Sheets

RAM-$\overset{2}{*}$

| NO | ADDRESS (DECIMAL SYSTEM) | DATA |
|---|---|---|
| 1 | 0 ~ 8<br>9 | KIMURA (NAME)<br>1 (CODE) |
| 2 | 10 ~ 18<br>19 | KIMURA<br>2 |
| 3 | 20 ~ 28<br>29 | KIMURA<br>3 |
| 4 | 30 ~ 38<br>39 | KIMURA<br>4 |
| 5 | 40 ~ 48<br>49 | KIMURA<br>5 |
| 6 | 50 ~ 58<br>59 | SIMIZU<br>6 |
| 7 | 60 ~ 68<br>69 | KONDO<br>7 |
| ⋮ | ⋮ | ⋮ |

FIG. 2-2

RAM - 3

| NO | ADDRESS (THE DECIMAL SYSTEM) | DATA |
|---|---|---|
| 1 | 0 ~ 30K | PATTERN OF "KIMURA" |
| 2 | 30K ~ 60K | 〃 |
| 3 | 60K ~ 90K | 〃 |
| 4 | 90K ~ 120K | 〃 |
| 5 | 120K ~ 150K | 〃 |
| 6 | 150K ~ 180K | PATTERN OF "SIMIZU" |
| 7 | 180K ~ 210K | PATTERN OF "KONDO" |
| ⋮ | ⋮ | ⋮ |

FIG.2-3

ROM

| ADDRESS | DATA | COINCIDING OUTPUT CODE OF PATTERN (DECIMAL SYSTEM) |
|---|---|---|
| 0 ~ 30K | PATTERN OF "SOS" | 101 |
| 30K~60K | 〃 | 102 |
| 60K~90K | 〃 | 103 |
| 90K~120K | 〃 | 104 |
| 120K~150K | 〃 | 105 |
| 150K~180K | PATTERN OF "A SUDDEN ILLNESS" | 106 |
| 180K~210K | 〃 | 107 |
| 210K~240K | 〃 | 108 |
| 240K~270K | 〃 | 109 |
| 270K~300K | 〃 | 110 |
| 300K~330K | PATTERN OF "EMERGENCY" | 111 |
| 330K~370K | 〃 | 112 |
| 370K~400K | 〃 | 113 |
| 400K~430K | 〃 | 114 |
| 430K~460K | 〃 | 115 |

REGIST

| Ai | Bo | Ca | Ni | | | | |
|----|----|----|----|--|--|--|--|
| 1  | 2  |    |    |  | 9| . | 0|

KANA                                    RETURN

TELEPHONE ANSWERING DEVICE WITH ARTIFICIAL INTELLIGENCE

BACKGROUND OF THE INVENTION

The present invention relates to a telephone answering device which has the ability of judgement by artificial intelligence.

A conventional telephone answering device is merely arranged so that only one kind of outgoing message previously recorded is sent to a calling party when the loop-forming circuit of the device is engaged upon receiving a call, and accordingly, it is impossible for the device to identify the name of the calling party who is calling and give an outgoing message or information which is the most suitable for the calling party.

SUMMARY OF THE INVENTION

It is an object of the present invention to judge the words spoken by the calling party, select the most suitable outgoing message or instruction message, and send the selected message.

It is another object of the present invention to make it possible to send the message previously arranged for the specific calling party by means of the voice recognition of the specific calling party's words previously registered in order to accomplish the above-mentioned first object in a refined manner.

It is a further object of the present invention to make it possible to send the most suitable message or information to not only the specific calling party but also specific words of an unspecific calling party.

It is a still another object of the present invention to make it possible to carry out total voice recognition as the mixture of the above-mentioned specific and unspecific calling party's voice recognition, and to perform the most suitable function of the telephone answering device.

The above and other objects, features and advantages of the present invention will become more apparent from the following description when taken in conjunction with the accompanying drawings in which a preferred embodiment of the present invention is shown by way of illustrative example. BRIEF DESCRIPTION OF THE DRAWINGS

FIGS. 2-1 to 2-3 are an illustration of the contents stored in the memory;

FIG. 3-1 is an illustration of the keys used therefor;

FIG. 4-1 is an illustration of the keys used therefor;

FIG. 5-1 is an illustration of the keys used therefor; and FIG. 6 shows how FIGS. 6(a) and 6(b) are related;

FIGS. 6(a) and 6(b) are a flow chart which shows operations of automatic answering and recording, voice recognition, and sending of the specific message.

DESCRIPTION OF THE PREFERRED EMBODIMENT

Now, the structure and function of an embodiment of the present invention will be described.

Figures 1, 1A:
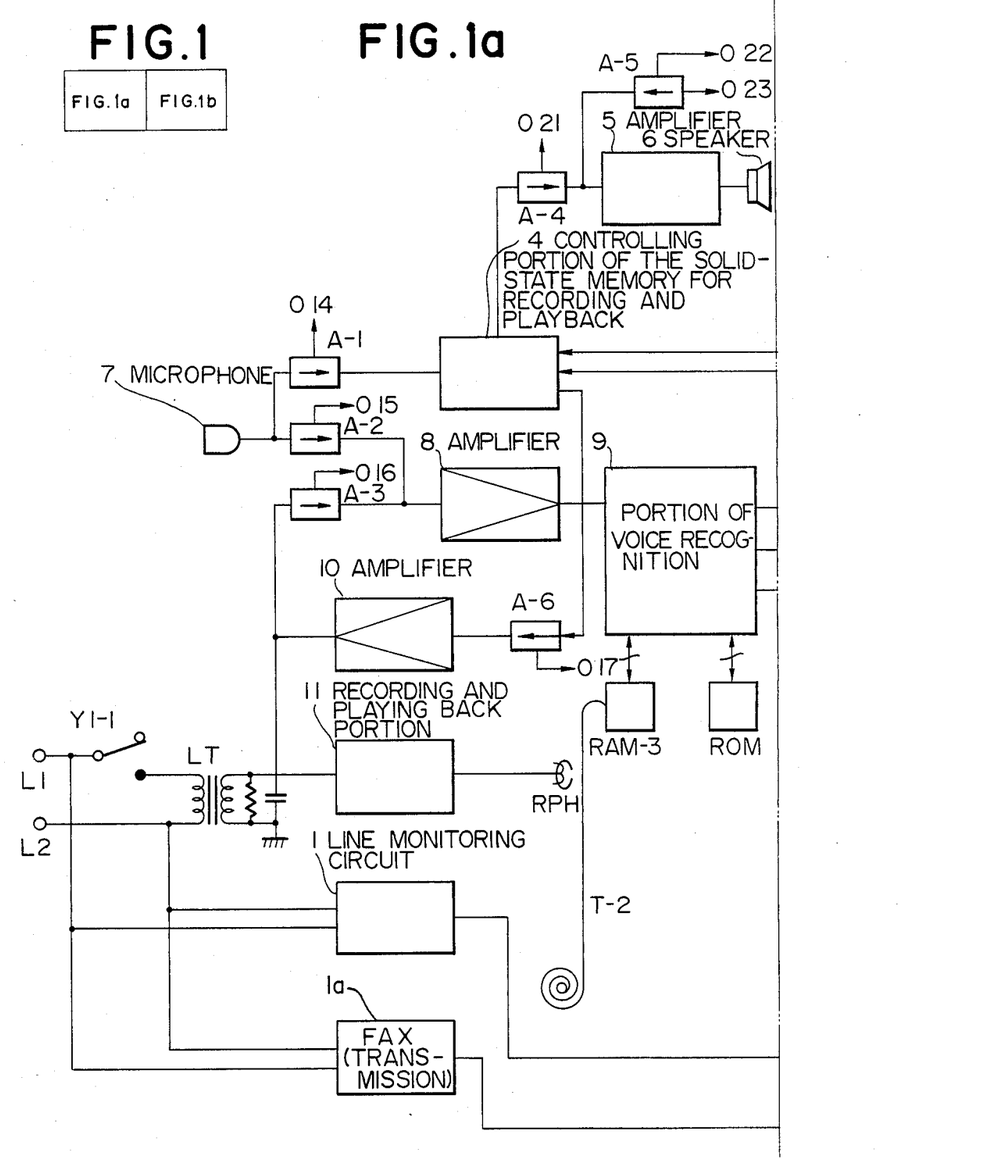
FIG. 1 shows how FIGS. 1(a) and (b) are related.
FIGS. 1(a) and 1(b) are a block view of the principle of the present invention.
Figure 1B:
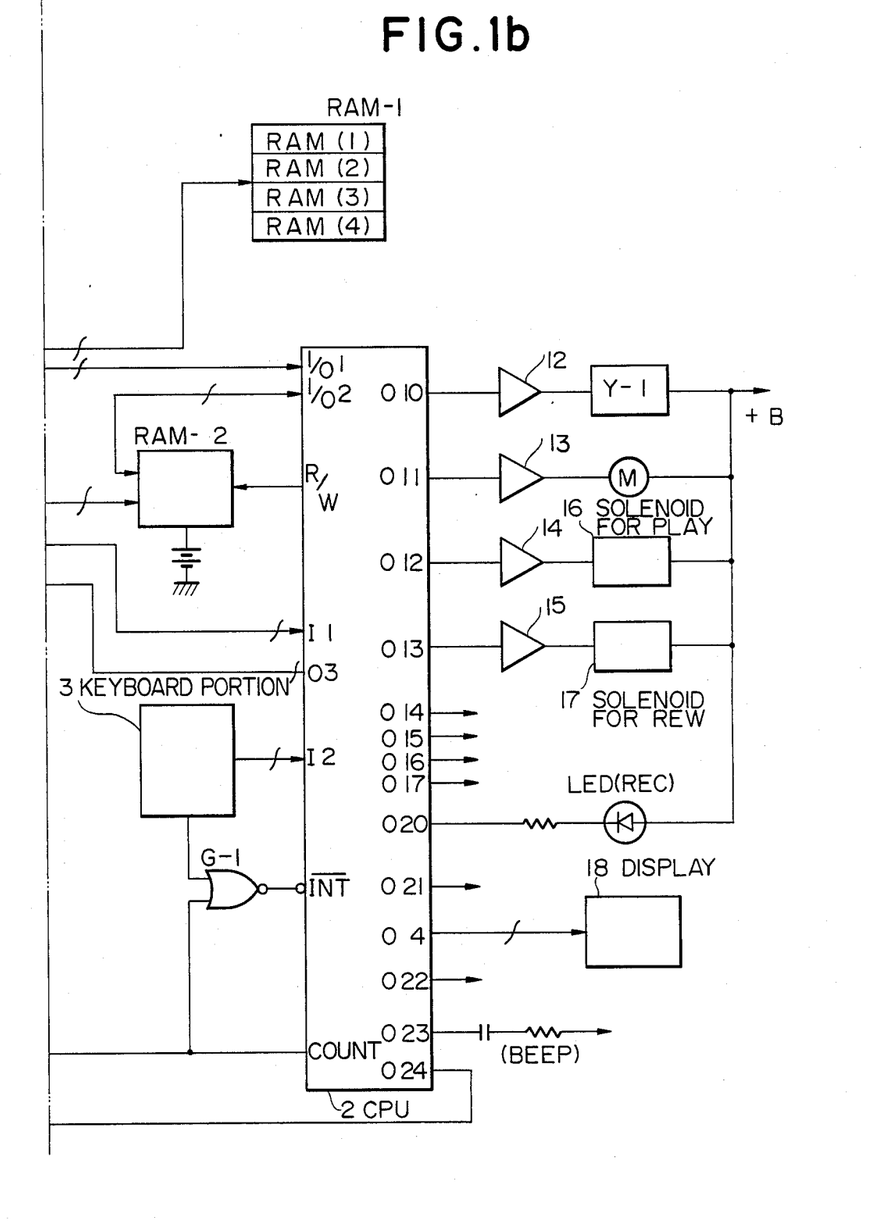

In FIG. 1, L1, L2 are telephone lines, LT is a line-transformer, reference numeral 1 designates a line monitoring circuit for detecting an on-hook (or a telephone cutting), reference numeral 1(a) designates a facsimile machine (FAX), reference numeral 2 designates a microprocessor CPU in which I's are input ports, O's are output ports, and the O's whose suffixes are two figures show the bit output. R/W is a read/write terminal connected to a memory RAM-2, INT is an interrupt terminal, COUNT is a counting input terminal for a counter build in the CPU, which operates to count the 16 Hz alternating current wave of the calling signal mentioned later. Reference numeral 3 designates a keyboard portion or keyboard section which comprises alphabet keys and kana (Japanese alphabet) keys both used for voice recognition mentioned later, and further numeral keys, and special keys such as "AUTO", "START" mentioned later. The keyboard section 3 is small-sized like a pocket-sized computer, wherein regularly used keys are arranged on the surface and non-regular keys such as alphabet and kana keys are arranged under the cover. Reference numeral 4 designates a controlling portion or control section which consists of a very-large-scale integrated (VLSI) circuit and is adapted to control recording to and playing back from a solid-state memory. The control section 4 is responsive to a command supplied from an input/output I/O1 in the CPU 2, to select either a recording mode or a playback mode, and, more specificaly, to make it possible to record and playback four kinds of messages respectively for 16 seconds in a dynamic randam access memory RAM-1. In order to increase the capacity of messages, the RAM may be enlarged. A general outgoing message is recorded in a RAM(1) of the RAM-1, and specific messages for specific calling parties to be recognized by voice recognition are recorded in a RAM(2) to a RAM(4). Reference numeral 5 designates an amplifier to amplify the playbacked output from the control section 4; 6 a loudspeaker; 7 a microphone to input the voice to the control section 4 and to a portion of voice recognition (voice recognition section) 9 mentioned later; and 8 an amplifer. The voice recognition section 9 consists of a VLSI circuit and is responsive to a code from the output port 03 of the CPU-2. Reference symbols RAM-2, RAM-3, and ROM are memories for the voice recognition. As shown in FIG. 2-1, stored in predetermined addresses of the RAM-2, which addresses correspond to registration numbers starting from 1, are: names to be recognized; and associated coinciding codes one of which is outputted when an associated voice is identified by the voice recognition mentioned later. They are stored by key operations, and for example, if the registeration number "1" is set and the name "Kimura" is inputted by key operations, "Kimura" is stored in a portion of the addresses 0–8 of the RAM-2, and the coinciding code "1" is stored in the address 9, with a blank space stored in the rest of the RAM-2. This procedure is repeated for the same person, for example, five times at a time or leaving an arbitrary time in between. Further, patterns "Kimura" for voice recognition, which are slightly different from each other depending on the voiced time, are registered at five memory locations in the predetermined addresses of the RAM-3, as shown in FIG. 2-2. In voice recognition, if it is determined that a voice has a pattern which coincides with any one of the five patterns, an associated coinciding code is outputted. The patterns of specific words voiced by unspecific persons such as "SOS" are stored in the ROM, wherein a standard pattern is stored together with four sub-standarded patterns which are different in age or sex distinction. In FIG. 2-3, an example of this is illustrated.

Next, reference numeral 10 designates an amplifier; 11 a recording and playing back portion (hereinafter referred to as a record/playback section) for recording and playing back a calling party's message; RPH a record/playback head; T-2 an incoming message tape; 12-15 drivers; Y-1 a relay for loop-forming; M a motor to drive the incoming message tape T-2; 16 a solenoid for playing the T-2; 17 a solenoid for rewinding or fast-forwarding; and 18 a liquid crystal display which displays letters inputted by the keyboard, the result of voice recognition, and so on.

Next, the operation of the device of the present invention will be concretely described with reference to a flow chart.

Figure 3:
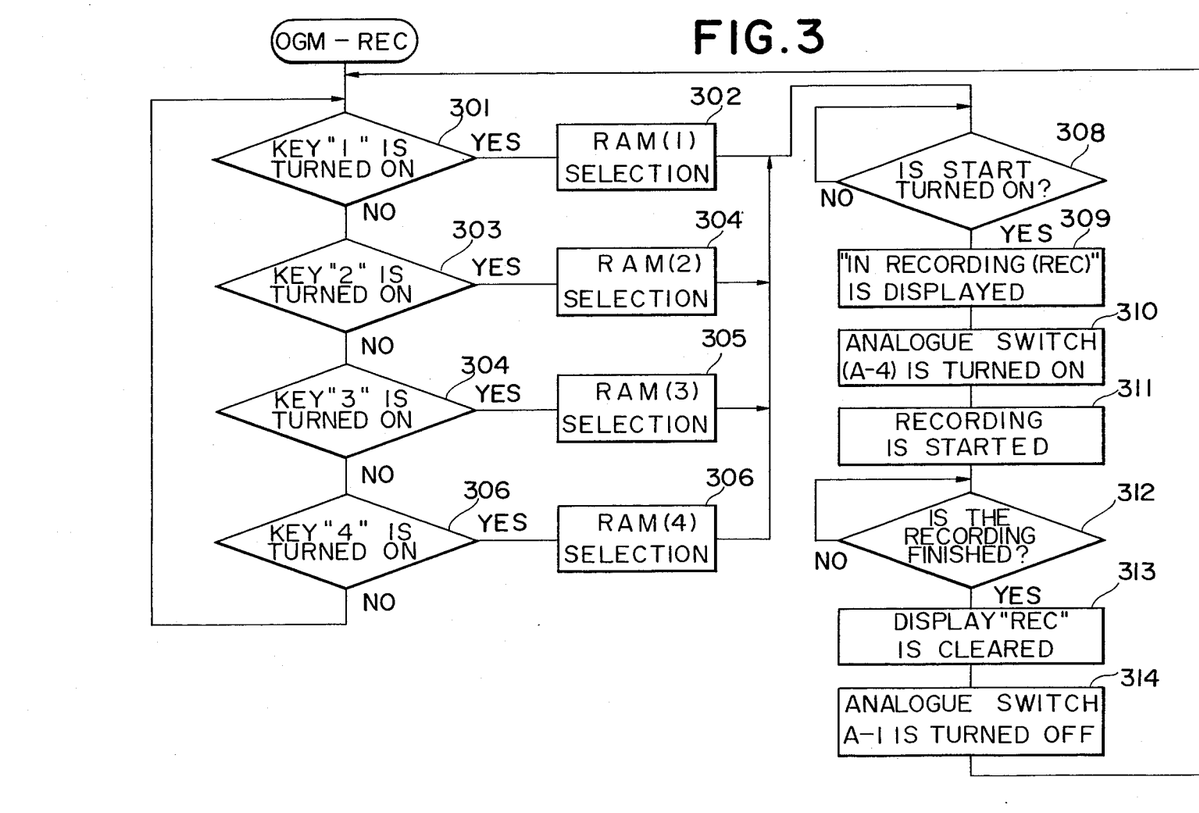
FIG. 3 is a flow chart which shows an operation of recording the outgoing message and the specific message to the memory.
Figure 31:
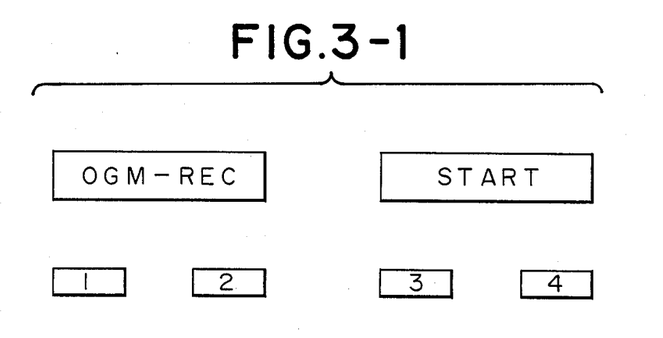

(1) Recording of outgoing message and messages for specific calling parties to the solid-state memory FIG. 3 is a flow chart which shows the recording of the outgoing message and the messages for the specific calling parties into the solid-state memory (RAM-1). FIG. 3-1 is an illustration which shows the associated keys of the keyboard section 3 (FIG. 1) used in the above-mentioned recording. If the key "OGM-REC" in FIG. 3-1 is pushed, the program jumps into the flow chart of FIG. 3. In order to record the outgoing message for the general calling party such as "This is Hashimoto corporation. Who's speaking please (blank portion for a couple of seconds)? Please speak your message after a beep (Beep).", Key "1" is pushed to be turned on (step 301). This is read by the program in the CPU 2 through the input port I2 of the CPU 2 in FIG. 1, and the RAM(1) in the memory RAM-1 is selected through the input/output port I/O1 and the control section 4 (step 302). Next, if the key "START" is pushed, "In RECORDING (REC)" is desplayed on the liquid crystal display 18 through the input port I2 and the output port 04 of the CPU 2 (steps 308, 309). Further, the output port 014 is set at a H level to turn the analogue switch A-1 on (step 310), and then the recording is started according to the code from the input/output port I/O1 (step 311). When the user speaks an outgoing message to the microphone 7, the same outgoing message is recorded in the RAM(1) of the memory RAM-1. Whether the RAM(1) is full or not is tested by the address counter in the control section 4, and if the RAM(1) is full, a predetermined code is outputted to the I/O1 (step 312). As a result, the display "IN RECORDING" is cleared (step 313), the analogue switch A-1 is turned off (step 314), and the program returns back to the step 301.

By performing operations similar to those mentioned above by means of the keys "2", "3" and "4", messages for the specific calling parties can be recorded in the RAM(2)-RAM(4).

Figure 4:
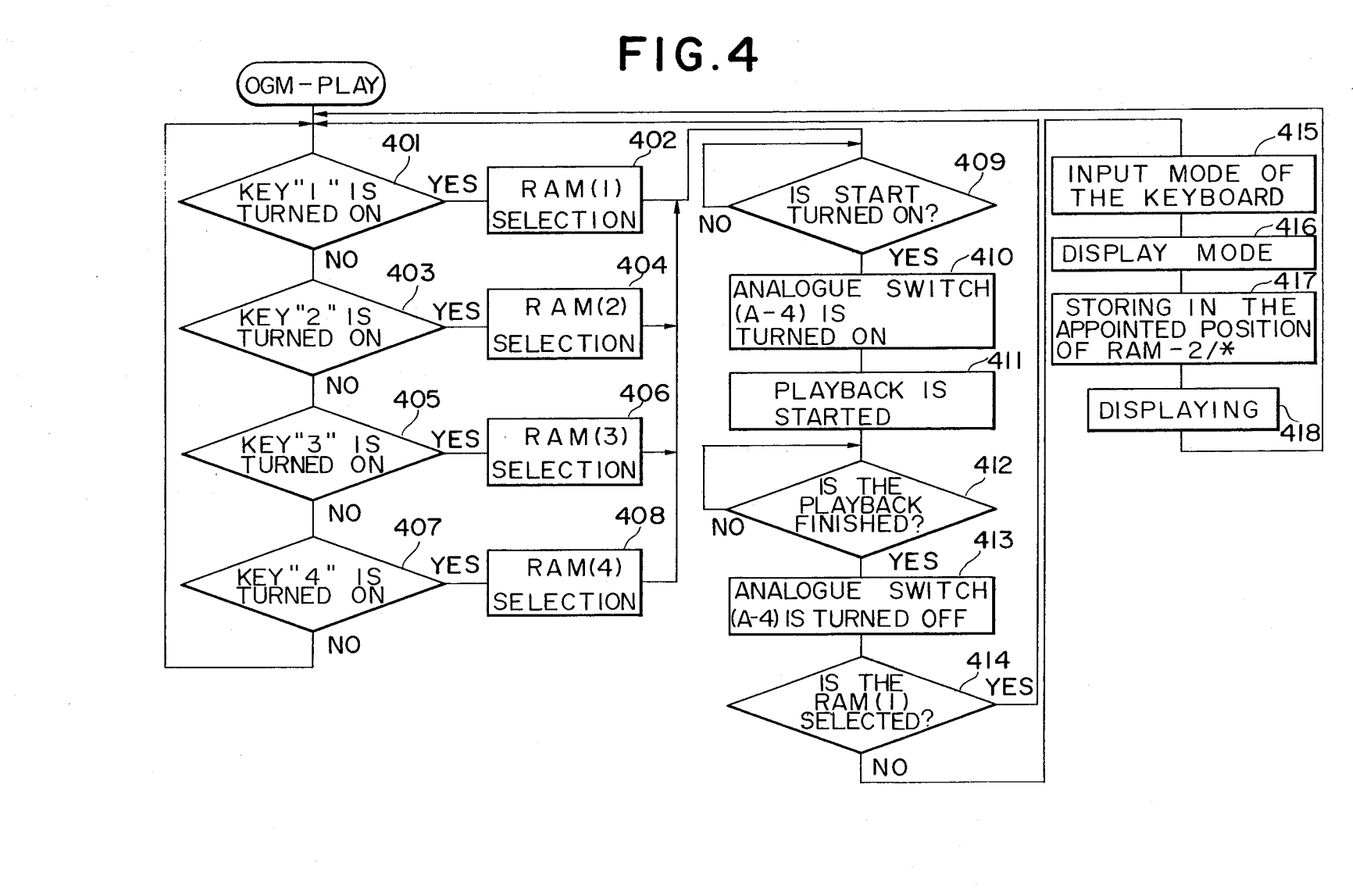
FIG. 4 is a flow chart which shows a playback operation of the outgoing message and the specific messages recorded in the memory, and a registration operation of the person to whom the above specific message is sent.
Figure 41:
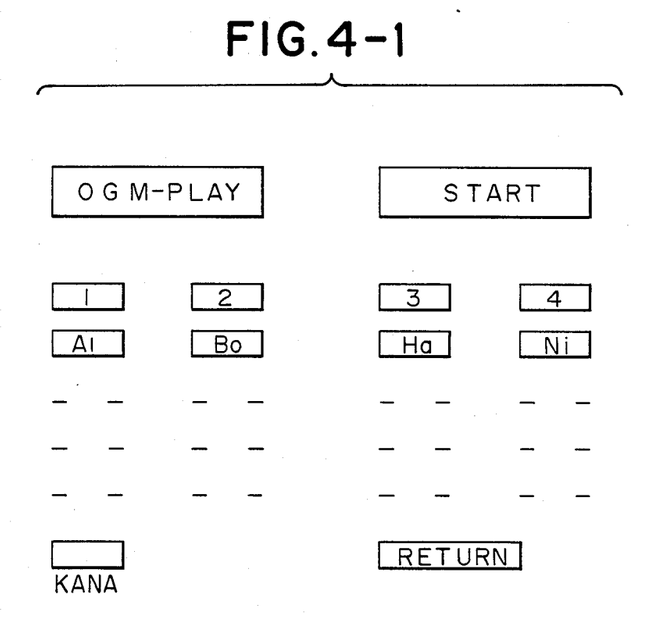

(2) Playback of the message recorded in the solid-state memory and appointment of the specific calling party FIG. 4 is a flow chart to playback the outgoing message and specific messages recorded by recording operation (1) mentioned above, to confirm these messages, and appoint the name to which the specific message is directed, and FIG. 4-1 illustrates the keys used therefor. If the key "OGM-PLAY" is pushed, the program jumps into the step 401 of FIG. 4. If any one of the keys "1"-"4" is pushed (steps 401, 403, 405, 407), an associated one of the memories RAM(1)-RAM(4) is selected (steps 402, 404, 406, 408). On this occasion, if the starting button "START" is pushed to be turned, the analogue switch A-4 is turned on (steps 409, 410), so that a predetermined code is supplied from the input/output port I/O1 to the control section 4, and the associated message is played back by the speaker SP through the analogue switch A-4 and the amplifier 5 (step 411). The completion of the playback is detected by the control section 4, as in the above-mentioned recording operation (step 412), and at the same time the analogue switch A-4 is turned off (step 413). In the next step 414, if the played back message is one stored in the RAM(1), i.e., the outgoing message for the general calling party, the program returns back to the step 401 waiting the next key input, but if the played back message is not such one, the program goes to the step 415 because it is the message for the specific calling party, and an input mode of the keyboard is entered, followed by a display mode in which a display associated with an operated key is made (step 416). The input such as the name, Kimura, inputted by usisng keys, is stored in the appointed position of the memory RAM-2 (consisting of a versatile type of memory), i.e., one of the appointed positions of the RAM(2)-RAM(4) which correspond to the keys "2", "3", and "4", by the interrupt operation (not shown). The name inputted from the key is displayed on the liquid crystal display 18 so as to enable the user to know the correspondence between the inputted name and the RAM(2)-RAM(4). For example, if the specific message recorded in the RAM(2) is for "Kimura", a display "2-Kimura" is made. Similarly, the specific messages recorded in the RAM(3) and RAM(4) are appointed to specific persons. Moreover, it is possible to use a specific message to plural names.

(3) Pattern registration for voice recognition

Figure 5:
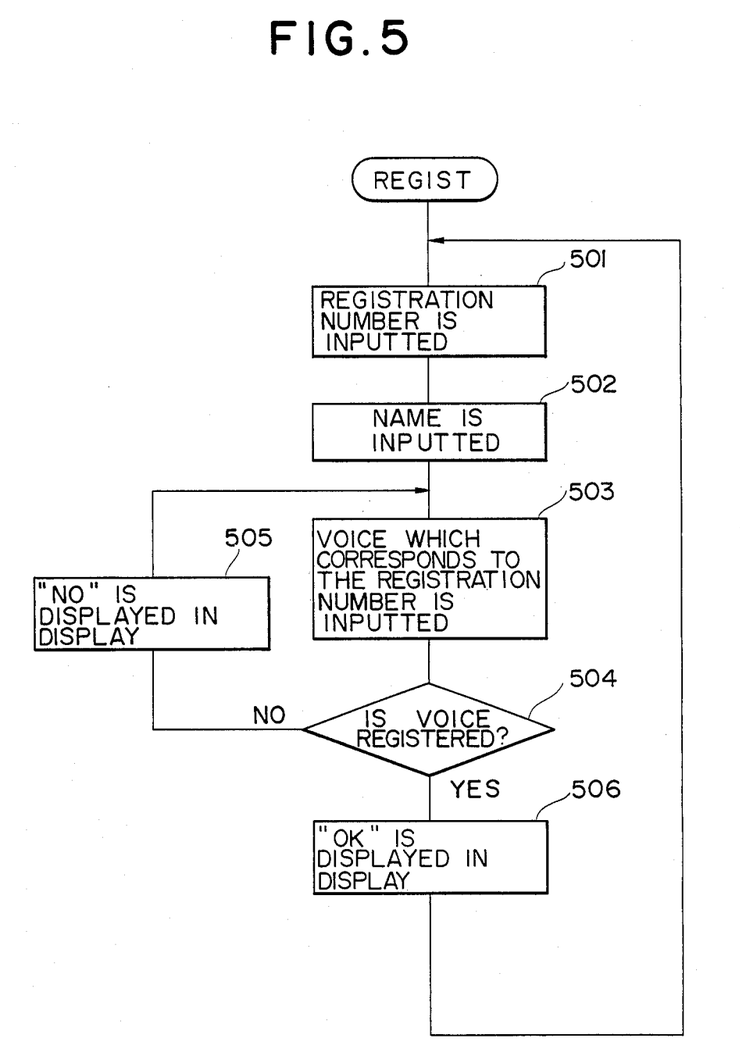
FIG. 5 is a flow chart which shows the registration operation to the voice recognition section.
Figure 51:
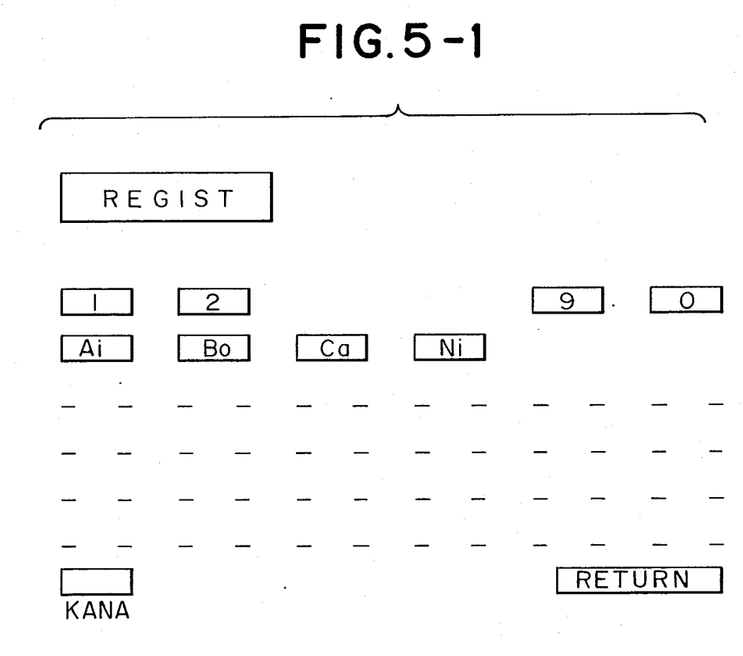

Next, the pattern registration to the memory RAM-3, which is adapted to store therein patterns to be recognized, will be described. As mentioned above, the outgoing message for general calling party is prepared to ask the calling party to speak his name, such as saying "Who's speaking please?". If the calling party is the specific person and his voice is recognized, the specific message for such person is sent. Now, the pattern registration for recognition is described. FIG. 5 is a flow chart for recognition and FIG. 5-1 shows the keys used therefor.

Figure 21:
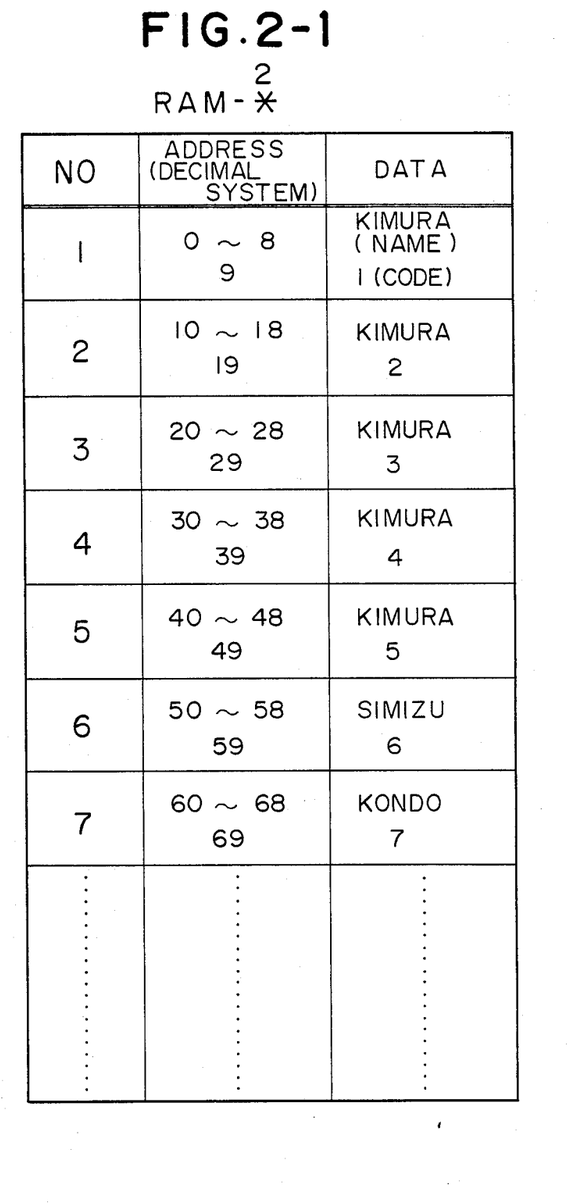
Figure 22:
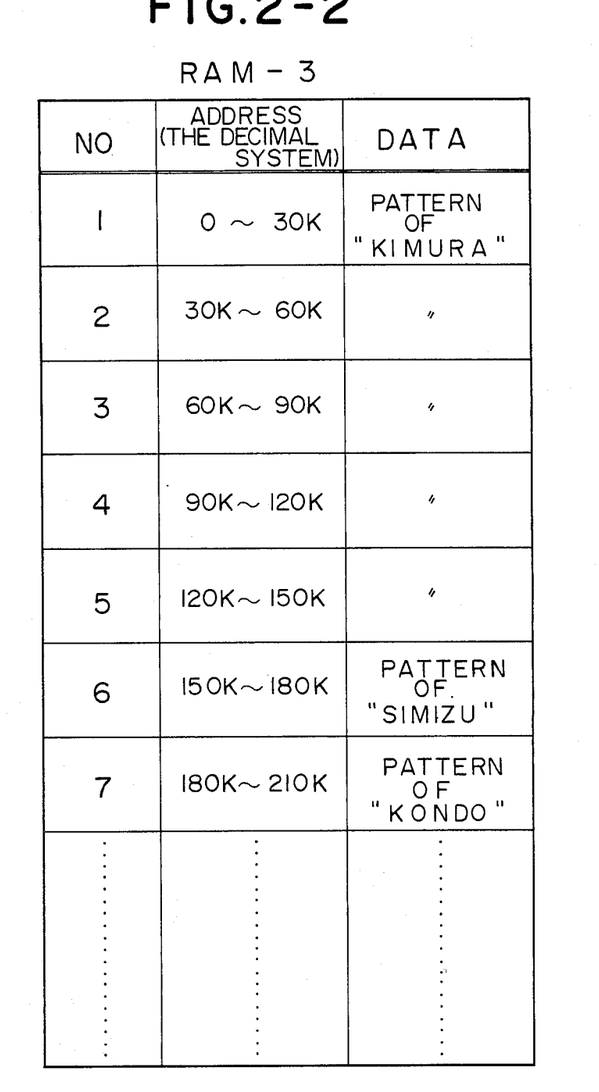

First, if the key "REGIST" is pushed, the program jumps to the step 501 of FIG. 5, where registration number is inputted. As shown in FIG. 2-1, the registration number starting from "1" is inputted. Input of "1" makes it possible to use a predetermined memory location (addresses 0-9) of the memory RAM-2. Next, if "Kimura", for instance, is inputted by using keys, the name is inputted or stored in a particular portion of the addresses 0-8 and a blank space is stored in the rest of the adresses 0-8 (step 502). Further, the same number as the registration number is stored in the address 9, so that the number "1" is outputted as the coinciding code when an affirmative recognition result is obtained during the voice recognition. In the next step 503, the person voices "Kimura", and the pattern of his voice is inputted or registered in the appointed position in the memory RAM-3. In the embodiment, it is registered in the addresses 0–30K of the RAM-3 as shown in FIG. 2-2. This is repeated five times by the same person, and the voice patterns of the same person which are different a little from each other are registerd in a manner corresponding to registration numbers 1–5, as shown in FIG. 2-1 and FIG. 2-2. In the present embodiment, because the registration of voice patterns is always able to be carried out by simply appointing the registration number, one voice pattern may be registered and the others may be on the other day. Further, the device is so arranged that a predetermined code is outputted from the voice recognition section 9 upon completion of registration of pattern. Accordingly, when this code is detected through the input port I1 of the CPU 2, a display "OK" may be displayed on the liquid crystal display 18. Next, the registration number is set to be "2" and the above-mentioned procedure is repeated until the registration of a necessary registration number will be finished.

(4) Automatic answering/recording operation, and voice recognition operation

When the recording of outgoing message, specific messages, respective names to which the specific messages are directed, and patterns for voice recognition have been completed, the user pushes the key "AUTO" in the keyboard section 3 in FIG. 1. Pushing the key makes the program jump to the step 601 of the flow chart in FIG. 6, where the calling signal of 16 Hz is detected through the line monitoring circuit 1 and the counting input terminal COUNT of the CPU in FIG. 1. If the calling signal is detected, the relay Y-1 is kept to be turned on through the output port O1) of 1 bit and the driver 12, the telephone lines L1, L2 are engaged through the relay contact Y1-1 (step 602). On this occasion, a command is supplied to the control section 4 through the input/output port I/O1, to start the playback of the outgoing message for general calling party peviously recorded in the RAM(1) of the RAM-1, sayng "This is Hashimoto corporation. Who's speaking please (followed by blank portion for a couple of seconds)?" This outgoing message is sent from the control section 4 to the calling party through the analogue switch A-6 (the output port 017 is kept at a H level at this time), the amplifier 10, and the line transformer LT. In the next step 604, a five second timer is started for the voice recognition in synchronism with the above-mentioned blank portion for a couple of seconds. Next, if the calling party voices his name according to the instruction of the outgoing message is amplified by the amplifier 8, and the voice reaches the voice recognition section 9 where the voice recognition is carried out in the above-mentioned five seconds following the outgoing message (steps 605, 606, 607, and 608). In the case that the affirmative recognition result is obtained during the blank portion for five seconds, the associated registration number as a recognizing code indicative of coincidence in voice pattern will be read from the RAM-2 through the memory RAM-3, at the step 609 through the steps 606 and 608. If the calling party is the specific person such as "Kimura" and the voiced pattern of "Kimura" coincides with the voice pattern whose registration number is 2 among the five voice patterns whose registration numbers are 1–5 in FIG. 2-2, the code "2" (a registration number) for voice recognition in the address 19 (in decimal) in FIG. 2-1 is read. In the next step 610, whether the code mentioned above is less than 100 (in decimal) or not is tested. In the present embodiment, the code beyond "100" is allotted to the code for unspecific persons such as "SOS", as mentioned later. As the code is expressed as "2", which is less than 100, the step is moved from step 610 to step 611. As mentioned above with reference to FIG. 4, the respective names of the specific messages stored in the RAM(-2)–RAM(3) of the memory RAM-1 have been previously appointed, therefore, in the step 611, the message for "Kimura" registered in RAM-2 is selected from the RAM(2)–RAM(3) and an associated message is sent out (step 612). The end of the specific message is monitored by the control section 4. When the specific message is over, the analogue switch used until that time and the-loop-forming relay Y-1 are turned off in order to release the engagment of the telephone lines (steps 613 and 614), so that the program proceeds to the step 601 where a standby condition is assumed.

Figures 6, 6A:
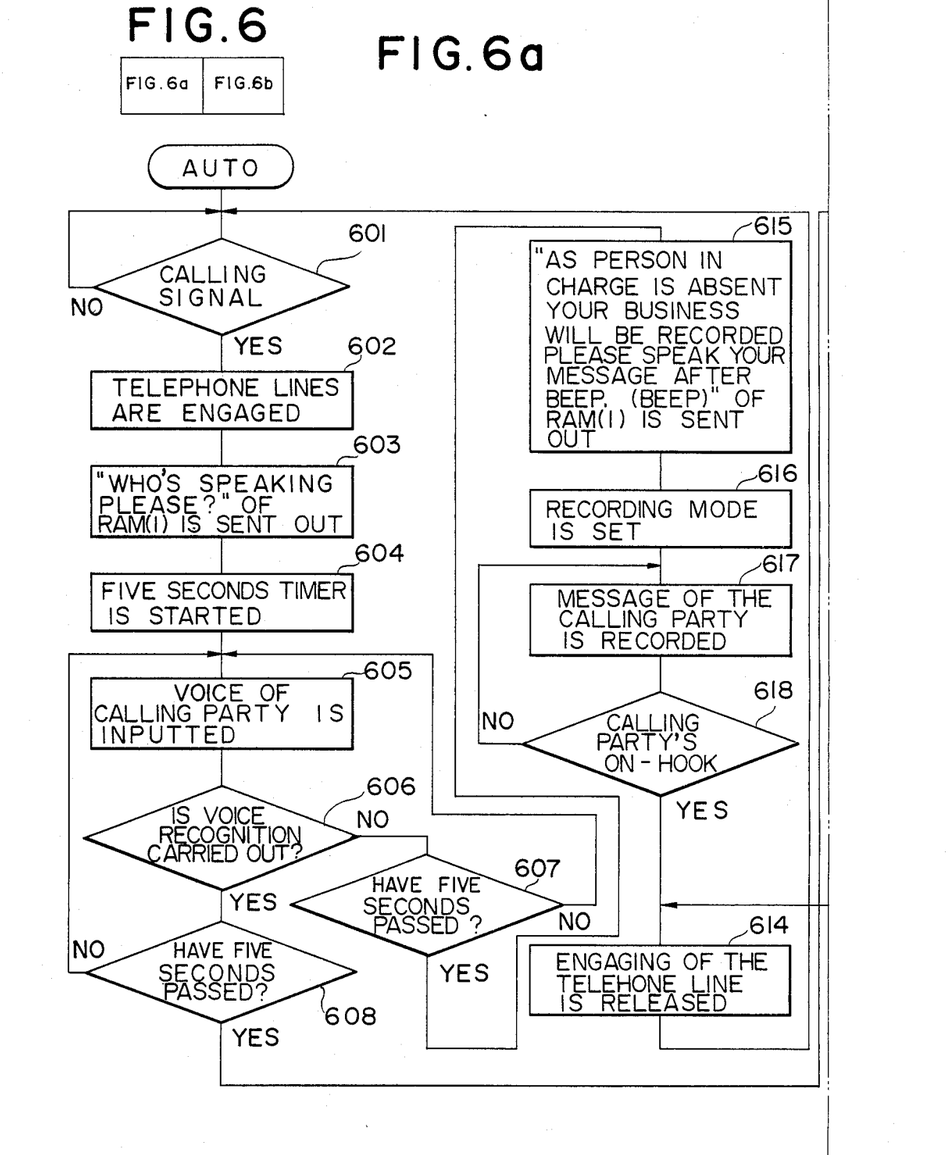
Figure 6B:
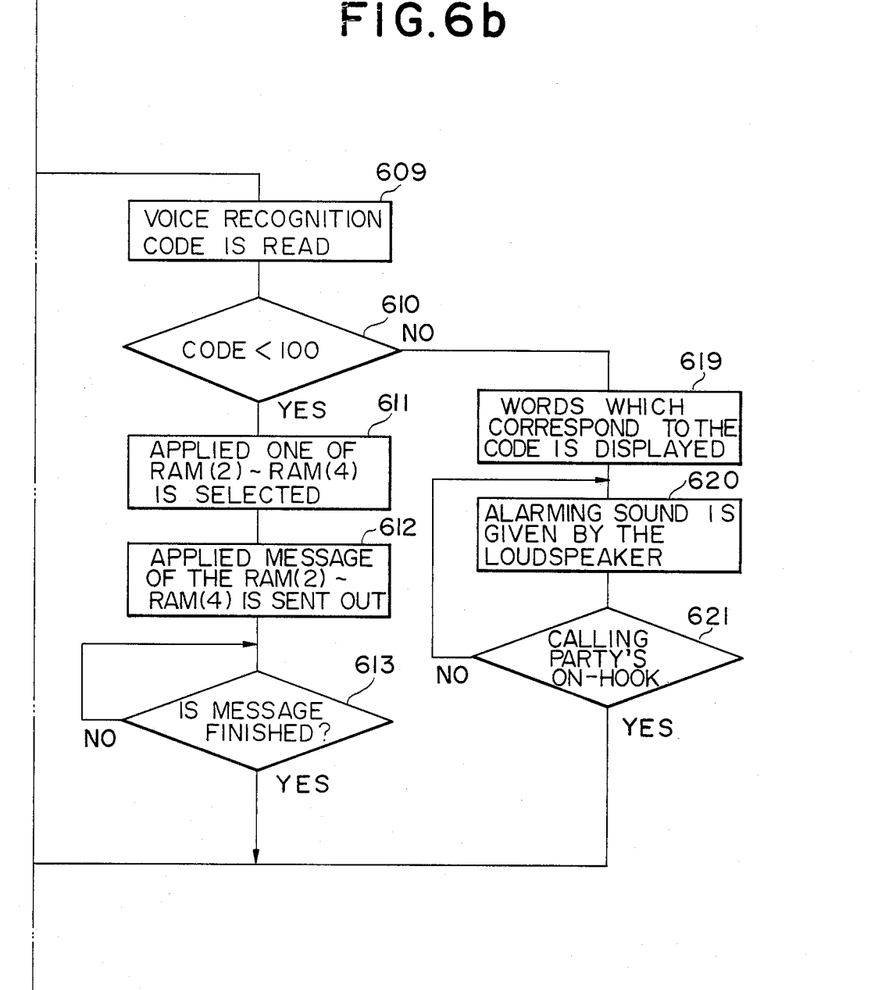

On the other hand, if the calling party is not recognized, i.e., if it is determined that he is an unspecific person at the step 606, the program moves from the step 606 to the step 607, where the message recorded in the latter half of the RAM(1) such as "As the person in charge is absent, your business will be recorded. Please speak your message after the beep (Beep)." is sent out after five minutes later. Next, the solenoid 16 for PLAY and the motor M are turned on and then the incoming message tape T-2 is set to the recording mode (step 616), so that the calling party's message is recorded in the incoming message tape until the calling party makes the telephone on-hook. Thereafter, the device will assume the standby condition (steps 617, 618, 614). By the way, the calling party's on-hook is detected by the line monitoring circuit 1.

Figure 23:
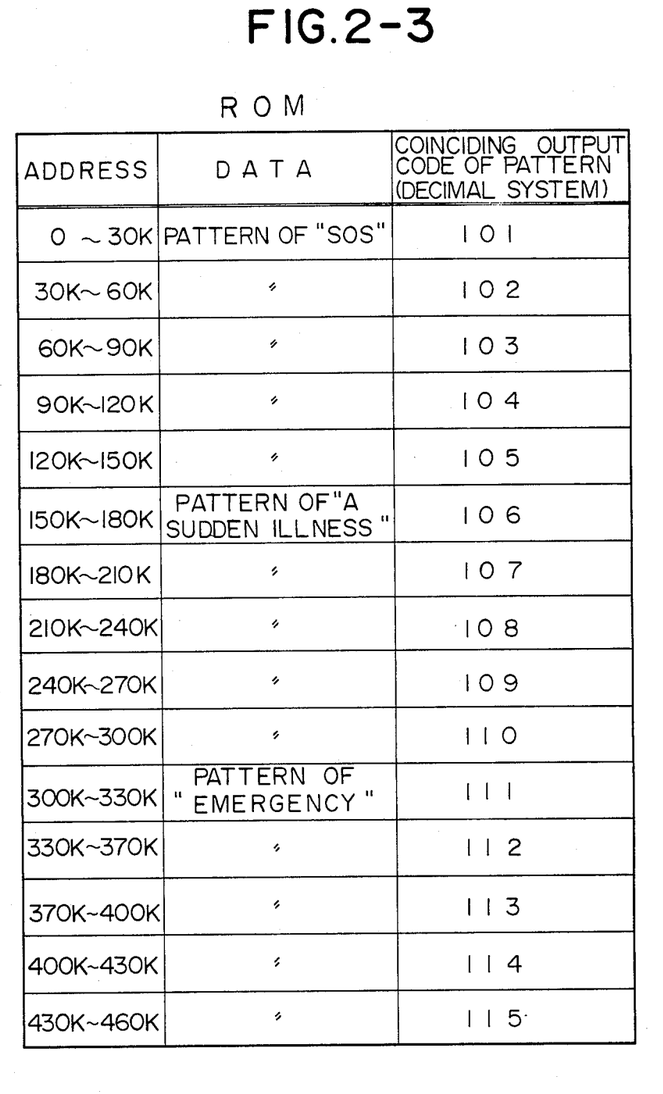

Next, an explanation will be made as to such case that the specific words such as "SOS" voiced by the specific or unspecific calling party are recognized in the step 606. In this case, the voice recognition code is read in the step 609 through the step 608, and, when an associated voice pattern cannot be found in the RAM-3, the voice patterns registered in the read-only memory ROM should be checked. In the above-mentioned case saying "SOS", if it coincides with the sub-standard pattern registered in the addresses 30K-60K of the FIG. 2-3, "102" is read as the code for the voice recognition (step 609). As this code has a value greater than "100", the program moves from the step 610 to the step 619 where the words which correspond to the code "SOS" in this case is displayed on the liquid crystal display 18. Further, until the time the calling party makes the telephone on-hook, an alarming sound produced by the program is outputted from the output port 023 and is amplified by the loudspeaker 6 through the amplifier 5 and the analogue switch A-5. If the operator at the side of the present device who heard the alarming sound makes the telephone (not shown) off-hook, the mutual talking becomes possible (not shown in the flow chart) and at the same time the above-mentioned alarming sound will be stopped by the line monitoring circuit 1.

Next, another embodiment of the present invention will be explained. In the above-mentioned embodiment shown in FIGS. 2-1 and 2-2, to improve the accuracy of recognition of voice of a person, the person repetitively registers his or her own voice pattern for a number of times. If a person asked to carry out the registration of voice pattern is a staff or a company, no particular problem occurs. On the other hand, it is a quite nuisance to a person other than the staffs of the company, if he or she is asked to do so. However, in case that a voice pattern of each person is registered one time alone and plural names which are the same to each other, Hashimoto, for instance, are registered, it becomes impossible to accurately discriminate one from others, or to recognize which Hashimoto speaks, due to a deterioration in a voice pattern which could occur with elapse of time, even if such discrimination can be accurately carried out at the beginning. In this embodiment, the device is so arranged as to send from the control section 4 shown in FIG. 1, a message for asking the caller to operate buttons of the telephone set so as to send his or her own telephone number, when a recoginition failure occurs. When the telephone number is sent in response to this message, the DTMF tone is detected by the voice recoginition section 9. Next, a data table recorded in the RAM 4 through the CPU 2, for instance, is referred to, in which table plural telephone numbers are listed together with associated names and coinciding codes. Then, a corresponding one coinciding code is outputted, which makes it possible to perform transmission of the predetermined message to the caller, as in the same manner mentioned hereinbefore.

As mentioned above, in the present invention, it is possible to register the information which is previously arranged with the specific calling party and to send out the most suitable message to the specific calling party by the voice recognition of the name or symbol. This thought or idea is not limited to the application to the telephone answering device, but may be applied to the communication of the equipment such as a facsimile system such as 1a shown in FIG. 1a.

That is to say, the device can register the number or name previously arranged with the specific person and can automatically send out the necessary informatin to the specific person by the comparison with the number or name. Such a use will not deviate from the spirit of the present invention. For example, in facsimile, it will be possible to judge the confidential calling party by the voice recognition feature and send the message previously prepared to this person.

Although a certain preferred embodiment has been shown and described, it should be understood that many changes and modifications may be made therein without departing from the scope of the invention.

What is claimed is:

1. A telephone answering device with artificial intelligence, comprising:
   means for storing plural outgoing messages;
   means responsive to receipt of an incoming telephone call for sending on a telephone line to a caller a greeting message, such as "who is speaking, please?";
   voice recognition means responsive to a voice characteristic of a response by the caller to the greeting message for identifying the caller as a specific caller;
   means for sending on the telephone line to the caller a particular outgoing message from said means for storing corresponding to said specific caller;
   further including means responsive to a touch tone code received from said caller for identifying said caller as a particular specific caller, whereby a specific caller can receive a specific message even if his or her voice is not identified by said voice recognition means.

2. The device of claim 1, wherein said voice recognition means includes further means for detecting emergency words, such as "SOS", etc., and, in response, sending on the telephone line to the caller, a predetermined response message, said further means being independent of the voice characteristic of the caller.

3. The device of claim 1, wherein said voice recognition means includes means for detecting a spoken word, such as the name of the caller, repeated several times, to improve voice recognition accuracy.

4. The device of claim 3, further including means for sending on the telephone line to the caller a supplementary message, such as "What is the name of your company?", to improve voice recognition accuracy of said voice recognition means to the voice of an unspecific caller.

5. The device of claim 1, wherein said voice recognition means includes means responsive to said response from the caller for determining whether the caller is a particular specific caller or is an unspecific caller.

6. The device of claim 1, further including means responsive to a failure of said voice recognition means to identify such caller as a specific caller, and for sending on the telephone line to said caller an instruction to send said touch tone code.

* * * * *